(12) United States Patent
Sedlacek, Jr.

(10) Patent No.: US 9,515,346 B2
(45) Date of Patent: Dec. 6, 2016

(54) POWER PLANT FUSE ARRANGEMENT

(75) Inventor: Wesley E. Sedlacek, Jr., South Windsor, CT (US)

(73) Assignee: Audi AG, Ingolstadt (DE)

( * ) Notice: Subject to any disclaimer, the term of this patent is extended or adjusted under 35 U.S.C. 154(b) by 926 days.

(21) Appl. No.: 13/258,097

(22) PCT Filed: Jun. 19, 2009

(86) PCT No.: PCT/US2009/047976
§ 371 (c)(1),
(2), (4) Date: Sep. 21, 2011

(87) PCT Pub. No.: WO2010/147597
PCT Pub. Date: Dec. 23, 2010

(65) Prior Publication Data
US 2012/0028150 A1 Feb. 2, 2012

(51) Int. Cl.
*H01M 8/04* (2016.01)
*H01M 8/24* (2016.01)

(52) U.S. Cl.
CPC ......... *H01M 8/249* (2013.01); *H01M 8/04559* (2013.01); *H01M 8/04679* (2013.01); *H01M 2250/10* (2013.01); *Y02B 90/14* (2013.01); *Y02E 60/50* (2013.01)

(58) Field of Classification Search
CPC ..................... H01M 8/04559; H01M 8/04679; H01M 5/249; H01M 2250/10; Y02B 90/14; Y02E 60/50
See application file for complete search history.

(56) References Cited

U.S. PATENT DOCUMENTS

| 2002/0158511 A1* | 10/2002 | Baumgartner et al. | ....... 303/199 |
| 2002/0192521 A1 | 12/2002 | Raiser et al. | |
| 2003/0039873 A1* | 2/2003 | Condit et al. | ................... 429/26 |
| 2006/0141306 A1 | 6/2006 | Kelley et al. | |

FOREIGN PATENT DOCUMENTS

| JP | 7282831 A | 10/1995 |
| JP | 2004171880 A | 6/2004 |

OTHER PUBLICATIONS

International Preliminary Report on Patentability for International application No. PCT/US2009/047976 mailed Jan. 5, 2012.
International Search Report and Written Opinion of the International Searching Authority for International application No. PCT/US2009/047976 mailed Mar. 22, 2010.

* cited by examiner

*Primary Examiner* — Monique Wills
(74) *Attorney, Agent, or Firm* — Seed IP Law Group LLP

(57) ABSTRACT

An exemplary power plant assembly includes a plurality of cell stack assemblies each having a plurality of fuel cells and a manifold. A fuse includes an indicator that provides an output when the fuse interrupts an electrically conductive connection between the manifold of a first one of the cell stack assemblies and a second one of the cell stack assemblies. The electrically conductive connection includes at least a portion of the voltage of the second one of the cell stack assemblies.

15 Claims, 1 Drawing Sheet

POWER PLANT FUSE ARRANGEMENT

BACKGROUND

Fuel cells are used to generate electrical power. There are several types of fuel cells and various uses for them. It is possible, for example to construct a power plant using a plurality of cell stack assemblies that each comprises many individual fuel cells. The number of cell stack assemblies and the number of cells in each stack depends on the desired total power output.

One of the issues present in fuel cell power plants is protecting against fault conditions that would result in an interruption of power output or damage to the power plant. For example, it is necessary to detect an electrical short within one of the cell stack assemblies. Such a short may occur when there is an electrical path between at least one of the cells and the manifold that is used to distribute fuel to the cells in a cell stack assembly, for example.

The manifolds are designed to be electrically isolated from the cells of the cell stack assembly. One approach includes a layer of a polytetrafluoroethylene-based material between the cells and the manifold. Under some conditions, that integrity of that layer can be compromised resulting in an electrical path between at least one of the cells and the manifold. Another situation that can occur in phosphoric acid fuel cell stack assemblies is that phosphoric acid can accumulate at the anode cell in a manner that results in an electrical path between the cell and the manifold.

Detecting such a short is important to maintaining a functional power plant. Unfortunately, conventional fuses are not suitable for detecting such shorts. There are known fuses that include an indicator switch that is activated responsive to a current surge with an associated voltage change of at least 75 Volts. When there is a short between a single cell and the manifold of a cell stack assembly, there is often only a single volt associated with the shorting event. Therefore, conventional fuses will not provide any indication of the shorting event because the associated change in voltage is well below the threshold of the indicator switch.

SUMMARY

An exemplary power plant assembly includes a plurality of cell stack assemblies each having a plurality of fuel cells and a manifold. A fuse includes an indicator that provides an output when the fuse interrupts an electrically conductive connection between the manifold of a first one of the cell stack assemblies and a second one of the cell stack assemblies. The electrically conductive connection includes at least a selected portion of a voltage of the second cell stack assembly.

The connection between the two cell stack assemblies ensures an adequate voltage change associated with the fuse interrupting the electrical connection so that the indicator provides the output even if only a single cell shorts to the manifold.

An exemplary method of monitoring a fuel cell power plant includes providing a fuse within an electrically conductive connection between a manifold of one cell stack assembly and another cell stack assembly. An indication is provided if the fuse interrupts the electrically conductive connection.

The various features and advantages of this invention will become apparent to those skilled in the art from the following detailed description. The drawings that accompany the detailed description can be briefly described as follows.

DETAILED DESCRIPTION

Figure 1:
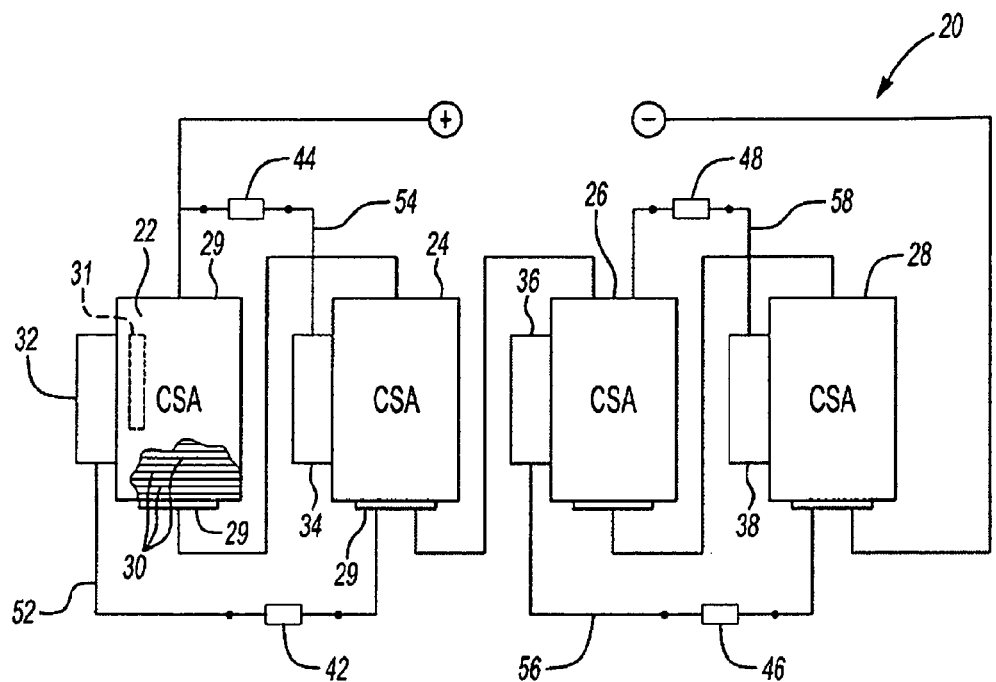
FIG. 1 schematically illustrates an example fuel cell power plant arrangement designed according to an embodiment of this invention.

FIG. 1 schematically shows selected portions of an example fuel cell power plant 20. A plurality of cell stack assemblies 22, 24, 26 and 28 are arranged electrically in series to provide electrical power. Each cell stack assembly includes a plurality of electrically conductive components. Example electrically conductive components include end plates 29, fuel cells 30 and coolant loop components 31. One of the fuel cells 30 is referred to as the anode cell at one end of the stack and a fuel cell 30 at an opposite end is referred to as the cathode cell of the same stack. The end plates 29 at the corresponding ends are referred to as the anode end plate and the cathode end plate, respectively.

In one example, each cell stack assembly includes 300 fuel cells 30, which each provide 1 Volt. Each cell stack assembly provides 300 Volts and the series connection of the four cell stack assemblies provides a total of 1200 Volts. Of course, different numbers of cells, cell stack assemblies and total power are possible with the illustrated arrangement.

Each cell stack assembly includes a manifold 32, 34, 36, 38, respectively. The manifolds are used in a known manner to provide fuel to the cells 30. The manifolds are configured to be electrically isolated from the cells 30.

The example power plant 20 includes monitoring components to monitor whether any undesired electrical conditions occur in the power plant 20. In this example, a plurality of monitoring fuses 42, 44, 46 and 48 are associated with the cell stack assemblies in a manner to protect against undetected shorts between any of the fuel cells 30 and their associated manifold.

The fuse 42 is part of an electrically conductive connection 52 between the manifold 32 of cell stack assembly 22 and the cell stack assembly 24. The fuse 42 provides an indication of a short between the manifold 32 and at least one of the cells 30 in the cell stack assembly 22. The electrically conductive connection 52 includes at least a selected portion of the voltage of the cell stack assembly 24 to ensure that there will be an adequate voltage change associated with any such short so that a relatively high indicator switch threshold of the fuse 42 will be met. Using the example parameters mentioned above, when the total 300 Volts of the cell stack assembly 24 is included in the connection 52, that ensures that there will be a 300 Volt change associated with any short that trips the fuse 42 even if the short involves only a single (i.e., 1 Volt) cell. This is because the electrically conductive connection 52 extends from the manifold 32 to the cell stack assembly 24, through the entire stack of the cell stack assembly 24 and then back to the cell stack assembly 22 and manifold 32.

Any one of the electrically conductive components of the cell stack assembly 24 may be selected as the connection point to establish the electrically conductive connection 52. In this example, the anode end plate 29 is used. Any one of the fuel cells 30 or any electrically conductive portion of the coolant loop 31 could be used.

Another fuse 44 is part of an electrically conductive connection 54 between the manifold 34 of cell stack assembly 24 and cell stack assembly 22. A third fuse 46 is part of an electrical connection 56 between the manifold 36 and the cell stack assembly 28. A fourth fuse 48 is part of an electrically conductive connection 58 between the manifold 38 and the cell stack assembly 26.

Figure 2:
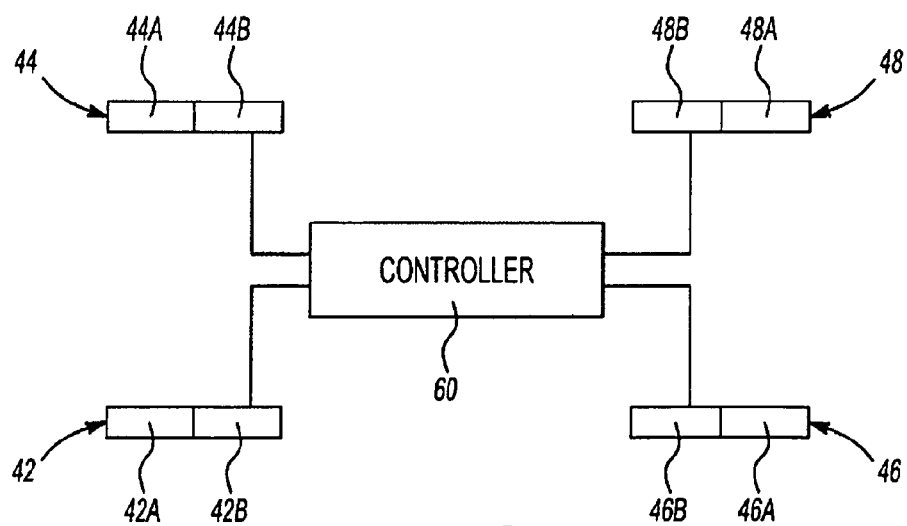
FIG. 2 schematically shows an example fuse and controller arrangement useful with the example of FIG. 1.

FIG. 2 schematically illustrates the fuses 42-48 and a controller 60 that is configured to monitor the operation of the power plant 20 at least for purposes of providing an indication of an electrical short that should be addressed by a technician or some automated procedure. The fuses 42-48 each have a fuse portion 42A-48A and an indicator portion 42B-48B, respectively. The fuse portions 42A-48A, respectively, interrupt the associated electrically conductive connection in the event of a current surge associated with a short of at least one cell 30 to its manifold. The indicator portions 42B-48B, respectively, provide an indication or signal to the controller 60 in the event that the associated fuse portion trips. The controller 60 is configured or programmed to communicate information regarding such an event so that appropriate action may be taken.

The example connections between manifolds and other cell stack assemblies ensures an adequate voltage change associated with the corresponding fuse interrupting the electrical connection so that the indicator provides the output even if only a single cell shorts to the manifold. The inclusion of enough of the voltage of the other cell stack assembly ensures that enough voltage change exists along the connection to exceed an indicator threshold of the fuse indicator portion 42B-48B. The illustrated arrangement of the fuses and the electrically conductive connections takes advantage of the way in which the cell stack assemblies are electrically coupled in series for providing the electrical power output of the power plant 20 in a manner that allows for using fuses that have a high voltage threshold for activating an indicator portion while still being able to provide reliable detection of shorts of even a single cell (i.e., a single volt change associated with a shorting event).

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A fuel cell power plant, comprising:
   a plurality of cell stack assemblies each including a plurality of fuel cells and a manifold; and
   at least one fuse that includes an indicator that provides an output when the fuse interrupts an electrically conductive connection between the manifold of a first one of the cell stack assemblies and a second one of the cell stack assemblies, the electrically conductive connection including at least a selected portion of a voltage of the second one of the cell stack assemblies.

2. The fuel cell power plant of claim 1, wherein the electrically conductive connection is between the manifold of the first one of the cell stack assemblies and an electrically conductive component of the second one of the cell stack assemblies.

3. The fuel cell power plant of claim 2, wherein the electrically conductive component comprises a fuel cell of the second one of the cell stack assemblies.

4. The fuel cell power plant of claim 2, wherein the electrically conductive component comprises an end plate of the second one of the cell stack assemblies.

5. The fuel cell power plant of claim 2, wherein the electrically conductive component comprises a portion of a coolant loop of the second one of the cell stack assemblies.

6. The fuel cell power plant of claim 1, wherein the electrically conductive connection includes an entire voltage of the second one of the cell stack assemblies.

7. The fuel cell power plant of claim 1, comprising a fuse associated with each of the plurality of cell stack assemblies, respectively, and wherein each fuse includes an indicator that provides an output when the fuse interrupts an associated electrically conductive connection between the associated manifold and another one of the cell stack assemblies.

8. The fuel cell power plant of claim 1, comprising
   a second fuse that includes an indicator that provides an output when the second fuse interrupts an electrically conductive connection between the manifold of the second one of the cell stack assemblies and the first one of the cell stack assemblies.

9. The fuel cell power plant of claim 8, comprising:
   a third fuse that includes an indicator that provides an output when the third fuse interrupts an electrically conductive connection between the manifold of a third one of the cell stack assemblies and a fourth one of the cell stack assemblies; and
   a fourth fuse that includes an indicator that provides an output when the fourth fuse interrupts an electrically conductive connection between the manifold of the fourth one of the cell stack assemblies and the third one of the cell stack assemblies.

10. The fuel cell power plant of claim 1, comprising a controller that receives the output of the indicator and provides information regarding the output.

11. The fuel cell power plant of claim 1, wherein the fuse indicator has a voltage threshold that controls activation of the indicator and the selected portion of the voltage of the second one of the cell stack assemblies exceeds the threshold.

12. A method of monitoring a fuel cell power plant, comprising the steps of:
   establishing an electrically conductive connection between a manifold of a first cell stack assembly and a second cell stack assembly, the electrically conductive connection including a fuse and at least a selected voltage of the second cell stack assembly; and
   providing an indication if the fuse interrupts the electrically conductive connection.

13. The method of claim 12, comprising providing the indication responsive to at least one fuel cell of the first cell stack assembly becoming electrically shorted to the manifold.

14. The method of claim 12, comprising providing a second fuse within a second electrically conductive connection between a manifold of the second cell stack assembly and the first cell stack assembly; and
   providing an indication if the second fuse interrupts the second electrically conductive connection.

15. The method of claim 12, comprising establishing the electrically conductive connection between the manifold and an electrically conductive component of the second cell stack assembly.

* * * * *